350-389 SR 1. X 2 3 / / 1

XR 3,902,788

Strehlow

X 4022 C

[11] 3,902,788

[45] Sept. 2, 1975

[54] OPTICAL MEMORY SYSTEM FOR READING, WRITING AND ERASING INFORMATION

[75] Inventor: Wolfgang H. Strehlow, Woodbury, Minn.

[73] Assignee: Minnesota Mining and Manufacturing Company, St. Paul, Minn.

[22] Filed: Mar. 13, 1974

[21] Appl. No.: 450,654

[52] U.S. Cl. ............ 350/150; 340/173.2; 350/160 R

[51] Int. Cl.² ............ G01F 1/01

[58] Field of Search... 350/150, 160 R, 167, DIG. 1; 356/71

[56] References Cited

UNITED STATES PATENTS

| | | | |
|---|---|---|---|
| 3,555,987 | 1/1971 | Browning | 350/167 |
| 3,676,864 | 7/1972 | Maure et al. | 350/160 R |
| 3,680,060 | 7/1972 | Keneman et al. | 340/173.2 |
| 3,765,749 | 10/1973 | LaMacchia | 350/161 |

OTHER PUBLICATIONS

Roberts, H. N. "Strain-Biased PLZT Input Devices," *Applied Optics*, Vol. 11, No. 2, Feb. 1972, pp. 397–404.

*Primary Examiner*—Ronald L. Wibert
*Assistant Examiner*—Richard A. Rosenberger
*Attorney, Agent, or Firm*—Alexander, Sell, Steldt & DeLaHunt

[57] ABSTRACT

A planar erasable memory material including a sandwich of a ferroelectric element and a photoconductor is addressed by a laser beam emitted from a single two dimensionally scannable electron beam laser. Memory locations are defined by individual lenses in a first planar array of identical lenses, each having a given *f* number and focal length, positioned parallel to the memory material. To write or erase in the memory material, the same is switched between transparent and opaque states in addressed areas thereof that are illuminated by an emitted laser beam of sufficient intensity when appropriate polarity voltages are applied to the memory material. An inverted, real image of a page of information contained in a page composer is written in the memory material by passing the emitted laser beam through a first lens for providing a parallel beam, passing the parallel beam through the page composer to a second lens from which a Fourier transform of the image is passed to an addressed lens in the first array of lenses for generating an inverted, real image in the memory material. The real image of the page of information is read from the memory material by passing the emitted laser beam through a transparent page composer, through the memory material as described above, and thence through a lens of a second array of lenses, identical in format to the first such array of lenses and positioned parallel to the memory material on the opposite side thereof, to a combining lens positioned for projecting the real image of the page of information to a common location at which a detector may be positioned for reading said image from any addressed memory location.

23 Claims, 6 Drawing Figures

OPTICAL MEMORY SYSTEM FOR READING, WRITING AND ERASING INFORMATION

BACKGROUND OF THE INVENTION

The present invention generally pertains to optical memory systems and is specifically directed to those systems for non-holographically reading, writing and erasing information in a memory material with an electronically scannable light beam, wherein binary data may be read and/or written in parallel. In optical memory systems like that of the present invention a page of information is stored (written) in the memory material by forming an image of a page composer at defined memory locations. Such a page of information may be read or erased therefrom by addressing the memory location with a light beam such as that emitted by a laser or a light emitting diode (LED).

An advanced prior art system of this type is described in U.S. Pat. No. 3,765,749 to LaMacchia. In that system the memory material is a thermoplastic resin combined with a photoconductor in a film structure, wherein memory locations are defined by the placement of matrices of electrodes and resistances for selectively energizing such locations individually to record light images focused thereon, or to erase recorded images therefrom. The memory material is located between a pair of lens arrays (each comprising multiple identical lenses forming a matrix). The number and format of the lenses in each array correspond to the number and format of the memory locations. Information is written into a selected memory location by projecting a desired light image from a first (write-in) array of light emitting diodes to all of the memory locations by means of a first such lens array and by selectively energizing the selected memory location to record the image by application of voltage to approriate electrodes. Individual memory locations are addressed for readout by energizing a selected light emitting diode in a second (readout) array thereof corresponding in both number and alignment to both the memory locations and the lenses of the second lens array, the latter being positioned therebetween for focusing emitted light from the energized LED to the aligned memory location. Such light is diffracted so as to reveal the recorded image from the memory location and is projected by the lens of the first lens array aligned therewith onto a photodetector array positioned at a common location for readout of a recorded image from any so addressed memory location. Accordingly, LaMacchia's system requires separately controlled addressing means for reading and writing and further requires that the various components be so placed that there is precise alignment between the individual memory locations in the memory material, the individual lenses of othe two lens arrays, the individual LEDs of the second (readout) array thereof, the first LED (write-in) array and the photodetector array.

SUMMARY OF THE INVENTION

The system of the present invention constitutes an improvement over the prior art discussed hereinabove in that a single means is used to address any memory location in a memory material, whether for writing, reading or erasing, in that the memory material does not have to be precisely aligned upon initial placement in the system, and in that individual lenses of lens arrays do not have to be precisely aligned with light emitting means for addressing the memory locations, provided that the lens arrays are generally aligned therewith and with detector means for readout of the recorded information.

The present invention provides the capability of reading, writing, and erasing information in a planar array of memory locations, from each of which memory locations an image of a page of the information is produced at a common location when any memory location in the array is addressed for reading by a laser beam.

The system includes a two-dimensionally scannable laser for emitting a laser beam for scanning the memory material to address any of the memory locations with the laser beam. Preferably the laser is an electron beam laser.

The system of the present invention also may include the memory material itself. Preferably the memory material used with the system of the present invention includes an erasable material comprising a sandwich of a ferroelectric material and a photoconductor. A preferred embodiment of this memory material is described in U.S. Pat. No. 3,680,060 to Keneman et al. and in an article by Keneman et al., "Phase Holograms in a Ferroelectric-Photoconductor Device," Applied Optics, Oct. 1970, vol. 9, No. 10, p. 2279. The ferroelectric element preferably is a bismuth titanate plate cut parallel to the *b* axis and at a 4° to 20° angle from the *a-b* plane.

The memory material can be reversibly switched between transparent and opaque states in selected areas that are exposed to sufficiently intense illumination by application of appropriate polarity voltages to the memory material. Such switching is enabled at beam intensity levels that can be provided by a laser beam of a scannable electron beam laser. In addition, this memory material allows for recording of high resolution images, is cyclable, and provides a reasonable diffraction efficiency.

The system of the present invention also includes means for controlling the writing, reading and erasing of information in the memory material. In the preferred embodiment wherein the memory material comprises a ferroelectric material photoconductor sandwich such control means includes means for applying appropriate polarity voltages to the memory material for switching between transparent and opaque states those areas thereof that are exposed to sufficiently intense illumination.

Also necessarily included within the system of the present invention are a first lens, a page composer, a second lens, first and second lens arrays and a combining lens. The first lens is positioned for projecting a parallel beam from the emitted laser beam.

The page composer is positioned for providing a page of information for projection by the parallel beam for recording in the memory material. The page composer may be selectively programmed to provide the page of information during the writing of information in the memory material, and may be made transparent to the parallel beam during the reading and erasing of the information in the memory material.

The page composer preferably comprises a material that can be reversibly switched between transparent and opaque states within given regions thereof by selective voltage application thereto. In the preferred embodiment, the page composer comprises an array of transparent electrodes applied to said page composer material in a predetermined pattern for enabling the provision of a desired image of information corresponding to the pattern in which voltages are applied to the electrodes for projection by said parallel beam during the writing of information in the memory material.

A preferred embodiment of the page composer material which may be used in this system is a transparent ferroelectric ceramic material (called PLZT) having very strong electrooptic properties, such as is described in an article by Roberts entitled "Strain Biased PLZT Input Devices (Page Composers) for Holographic Memories and Optical Data Processing," Applied Optics, February 1972, vol. 11. No. 2, p. 397.

A second lens is positioned for projecting toward the memory material an image of the page of information projected in said parallel beam. A first lens array, consisting of a planar array of identical lenses each having a given f number and focal length, is positioned parallel to said memory material, whereby the array pattern of the lenses defines a corresponding array pattern of memory locations in the memory material.

In order to write in the memory material, a laser beam projecting an image of the page composer is addressed to a lens of the first array defining a selected memory location and a voltage of appropriate polarity is applied to the memory material, thereby generating and storing in the selected memory location an image of the page of information provided in said parallel beam by the page composer.

In order to enable readout of information from the memory material, a second lens array having an array pattern identical to that of the first lens array, wherein each lens is identical and has a given f number and focal length, is positioned parallel to said first lens array. A combining lens is positioned in combination with the second lens array, so that when a "laser" beam projected through a "transparent" page composer is addressed to the selected memory location, an image of the page of information stored in the selected memory location is generated at a common location at which a detector may be positioned for reading information from any addressed memory location. Erasure is effected by focusing the laser beam to the memory location that is to be erased and then applying the appropriate polarity voltage to the memory material.

DESCRIPTION OF THE PREFERRED EMBODIMENT

Figure 1:
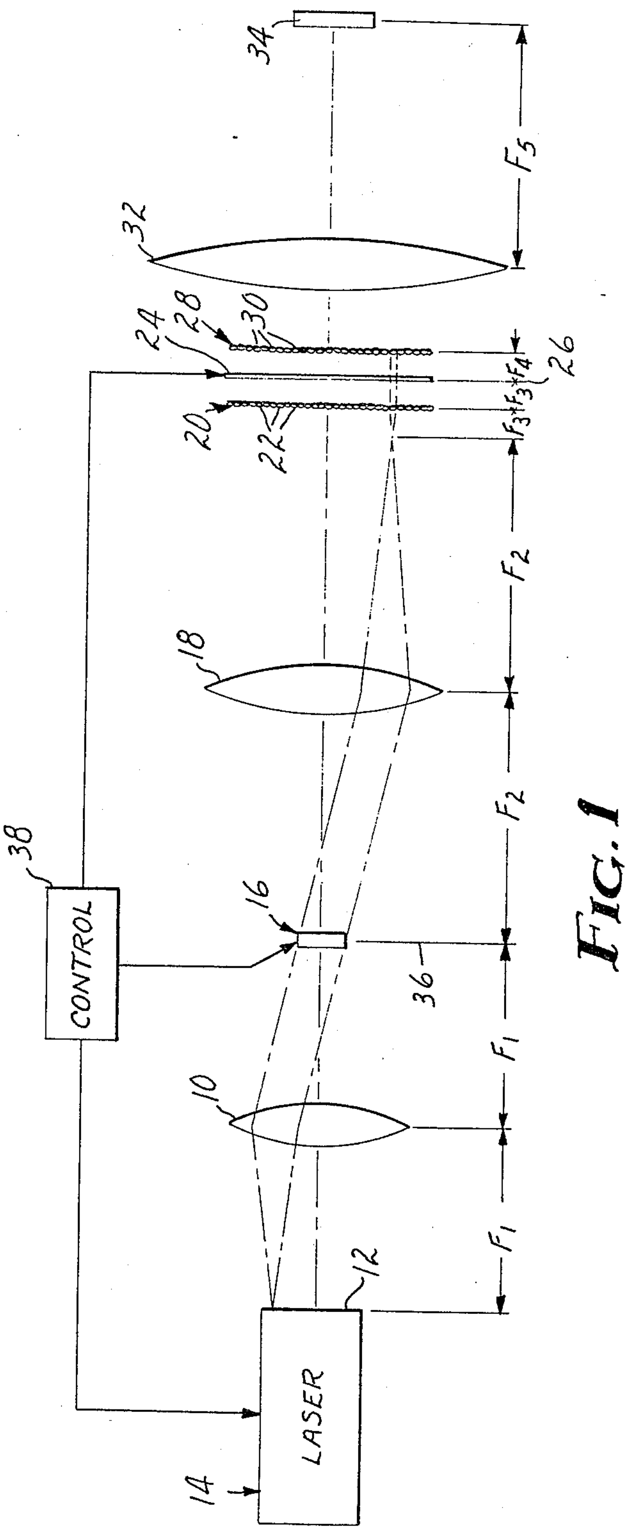
FIG. 1 is a schematic view of an optical memory system according to the present invention.

Referring to FIG. 1, a first lens 10 is positioned at its focal length $F_1$ from the planar cavity 12 of a two-dimensionally scannable electron beam laser 14. A page composer 16 is positioned at the focal length $F_1$ from the first lens 10. A second lens 18 is positioned at its focal length $F_2$ from the page composer 16.

A first lens array 20 is positioned from the second lens 18 at a distance equal to the focal length $F_2$ plus the focal length $F_3$ of each of the identical lenses 22 included in the first lens array 20.

Figure 1A:
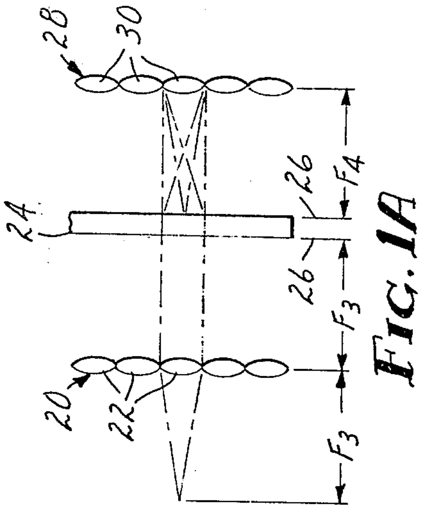
FIG. 1A is an enlarged view of part of the system of FIG. 1 showing cut-away portions of the two lens arrays and the memory material in greater detail.

Also referring to FIG. 1A, the memory material 24 is positioned with its memory plane 26 at the focal length $F_3$ from the first lens array 20. A second lens array 28 is positioned from the memory plane 26 at the focal length $F_4$ of each of the identical lenses 30 included in the second lens array 38. As will be discussed hereinafter with reference to FIG. 4, in the preferred embodiment the memory plane 26 has a finite thickness corresponding to that of the memory material 24.

A combining lens 32 having a focal length $F_5$ is positioned in relation to the second lens array 28 and at a distance $F_5$ from a detector array 34 for enabling generation of the real image of a page of information from any memory location of the memory material 24 to the position of the detector array 34. The focusing effect in the system of FIG. 1 provided by the combining lens 32 is described in U.S. Pat. No. 3,676,864 to Maure et al. with reference to FIG. 2 therein; said description being incorporated herein by reference thereto.

The combined effect of the lens 18 and any individual lens 22 of the first lens array 20 can be described in optical imaging processing terminology as that of two consecutive Fourier transforms. A detailed derivation is described in A. R. Shulman, "Optical Data Processing," Wiley, New York, New York, 1970, pp.208; said description being incorporated herein by reference thereto. Briefly, a Fourier transform of a Fourier transform can be written as $$S(-x_1,-y_1) = \int\int F(u,v)e^{-j2\pi(ux_1+vy_1)}du\,dv,$$

with $F(u,v)$ being the two-dimensional Fourier transform of an input image $A(x_1y_1)$, e.g. the light amplitude distribution in the plane 36 of the page composer 16. The output image $S(-x_1,-y_1)$ generated at the memory plane 26 is proportional to the input image $A(x_1y_1)$, with a magnification factor $F_3/F_2$, and is inverted with respect to the image $A(x_1y_1)$ at the page composer plane 36, as is indicated by the minus sign of the coordinates.

The combined effect of the combining lens 32 and any individual lens 30 of the second lens array 28 can also be described in accordance with the same mathematical formalism. In the preferred embodiment of the system of the present invention, as described with reference to the aforementioned Maure et al. patent, this combined effect is to invert the image stored at the memory plane so as to provide at the detector array 34 a real image of the image at the page composer plane 36.

The planar laser cavity 12, the page composer 16, the two lens arrays 20 and 28, the memory material 24 and the detector array 34 are positioned plane-parallel to one another. A control means 38 is connected to the laser 14, the page composer 16 and the memory material 24 for controlling their respective operations.

Figures 2, 4:
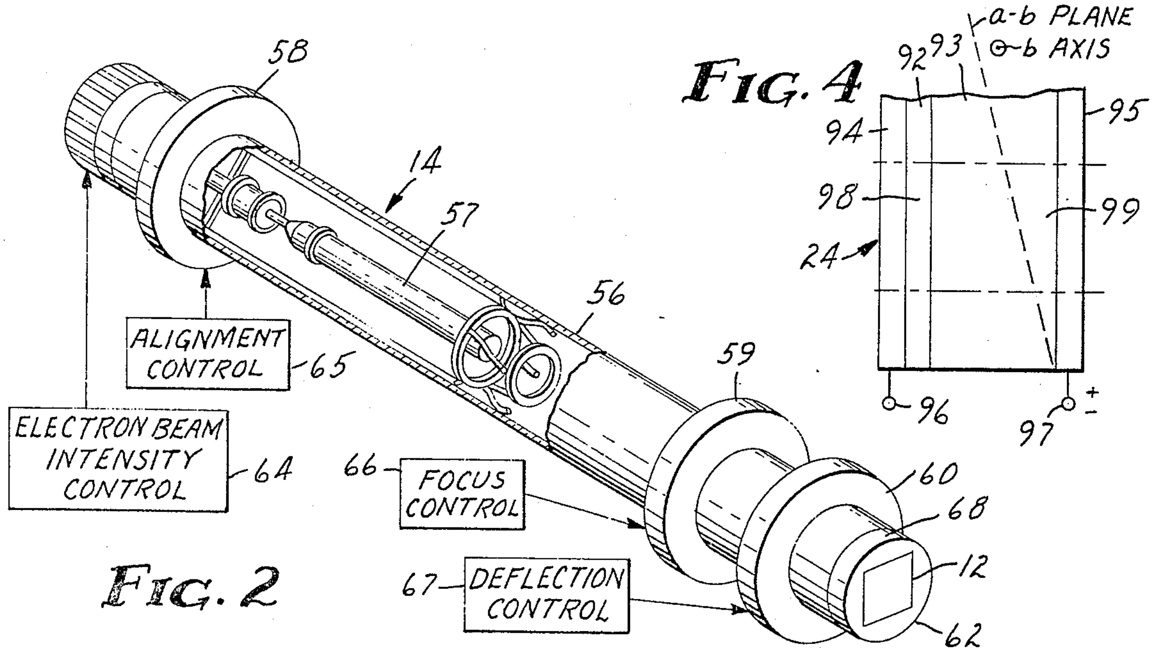
FIG. 2 is a view of the laser included in the system of FIG. 1, with a portion of the tube cut away in order to illustrate the electron gun.
FIG. 4 is an edge view of a cut-away portion of the memory material included in the system of FIG. 1, showing transparent electrodes applied to the memory material, and schematically illustrating the optical effects of writing in the memory material.

The two-dimensionally scannable electron beam laser 14 used in the optical memory readout system of FIG. 1, is illustrated in FIG. 2. The electron beam laser 14 includes a sealed evacuated tube envelope 56 containing an electron gun 57, an alignment coil 58, a focus coil 59, a deflection coil 60 and a laser cavity 12 comprising a broad direct band-gap semiconductor crystal 12 which is bonded to the inside surface of a transparent sapphire face plate 62.

An electron beam intensity control circuit 64, an alignment control circuit 65, a focus control circuit 66 and a deflection control circuit 67 are also provided. These circuits are connected to the control means 38.

The laser cavity 12 includes a polished wafer of a direct band-gap semiconductor crystal. Semiconductor materials which have been found to be suitable include cadmium sulfide, cadmium selenide, cadmium sulfur selenide and gallium arsenide. A crystal which will lase at room temperature is selected in accordance with the process described in U.S. pat. No. 3,715,162, to Campbell et al., said description being incorporated hereby by reference thereto. The semiconductor crystal is polished to provide two planoparallel faces. The spacing between the two faces then determines the cavity thickness, which is on order of 10 to 50 micrometers. The two lateral broad dimensions of the cavity are about 1 inch (2.54 cm.). The crystal faces are mirrored such as by vapor coating with silver or aluminum in order to achieve a reflectivity of about 96 percent and about 92 percent on the bombarded and opposite crystal faces respectively. The crystal may also be reflectivity coated with reflectively multiple layer dielectric such as a composition of alternate layers of cryolite and zinc sulfide.

The sapphire face plate 62 is secured to the glass tube envelope 56 by means of an indium seal (not shown) and a brass ring anode 68. The inside surface of this end of the glass tube envelope 56 is covered by a graphite coating which contacts the indium seal, which in turn contacts the brass ring anode 68. The graphite coating extends to also contact the anode clips of the electron gun 57.

The brass ring anode 68 is grounded when the laser 14 is installed for operation, and a negatively biased voltage source (not shown) is connected to the electron gun cathode contacts (not shown).

In operation, an electron beam generated by the electron gun 57 bombards the inside face of the crystal laser cavity 12. The electron beam is focused such that the spot size is on the order of a diameter of about 25 micrometers. The electron beam energy is selected to be in a range between 20 keV and 70 keV. The current density is of the order of ten amperes/$cm^2$, and is in excess of the threshold level needed to excite stimulated emission in the crystal laser cavity 12. A laser beam emerges through the opposite face of the crystal laser cavity 12 at a location opposite to the location bombarded by the electron beam.

Deflection of the electron beam from the electron gun 57 to any selected location of the broad bombarded surface of the crystal laser cavity 12 thus results in the generation of a laser beam from a corresponding location of the broad opposite planar surface of the crystal laser cavity 12. The laser beam is emitted in a diverging cone which is normal to this opposite surface. The electron beam is impinged upon the crystal laser cavity 12 in a pulsed mode with a pulse width of between 10–100 nanoseconds. The rise time and decay time of the laser emission is of the order of a few nanoseconds. Thus, the laser beam pulse generally corresponds to the electron beam pulse. Further description of two-dimensionally scannable electron beam lasers is contained in U.S. Pat. No. 3,757,250 to Packard et al., said description being incorporated herein by reference thereto.

Figure 3:
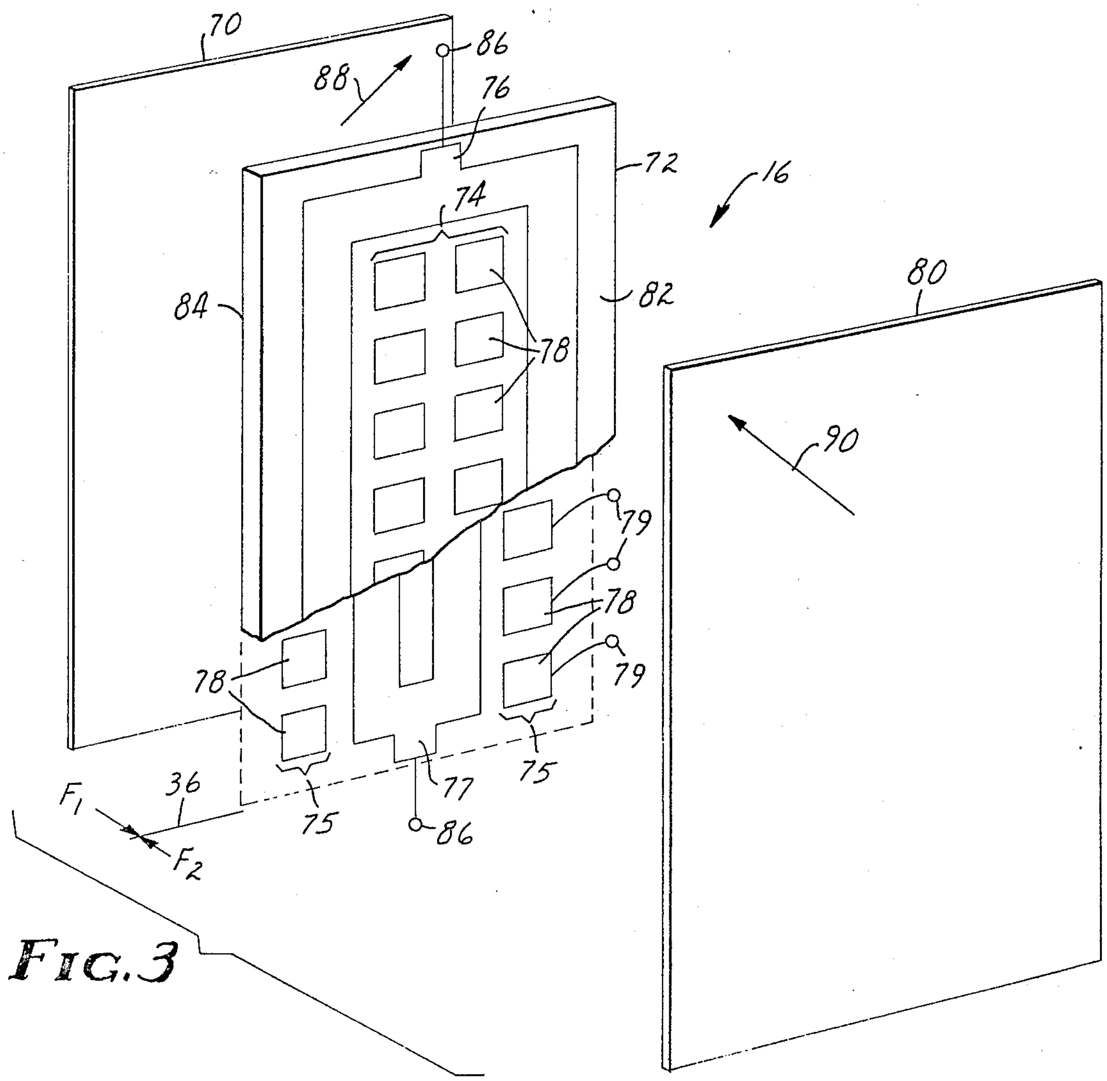
FIG. 3 is an exploded perspective view of the page composer included in the system of FIG. 1, showing the predetermined pattern of transparent electrodes applied thereto, with the top portion showing the electrode pattern on the front side of the page composer material and the bottom portion having the page composer material broken away to show the eletrode pattern on the reverse side thereof; and further showing a polarizer and an analyzer positioned on opposite sides of the page composer material.

A page composer 16 for writing information in the memory material 24 in parallel is shown in FIG. 3.

The page composer includes a polarizer 70, a ferroelectric page composer material 72 having transparent electrodes 74, 75, 76, 77 applied thereto, and an analyzer 80; the polarizer 70 and the analyzer 80 being positioned on opposite sides of the page composer material 72.

The ferroelectric page composer material is strain biased PLZT, which is described in the above cited publication by Roberts; said description being incorporated herein by reference thereto.

The page composer material 72 can be reversibly switched between transparent and opaque states within given regions thereof by selective voltage application thereto. These regions are covered by an array of transparent electrodes 74, 75, 76, 77 applied to the page composer material 72 for enabling the provision of a desired image of information corresponding to the pattern in which voltages are applied to the electrodes 74, 75, 76, 77. The predetermined pattern is defined by two separate sets of said electrodes 74 and 75 with each pattern defining electrode 78 being individually connected to a separate terminal 79 for having a selected voltage applied thereto. To simplify the Drawing the terminals 79 are shown schematically as connected to only those electrodes 78 shown in the lower right hand corner. The connections between each of the electrodes 78 and their respective terminals preferably are in the form of conductive films (not shown) applied to the page composer material 72. The two sets of pattern defining electrodes 74 and 75 are applied on opposite sides 82 and 84 of the page composer material 72 in a non-opposing relationship; and common ground electrodes 76 and 77 are applied on opposite sides 82 and 84 of the page composer material 72 in an opposing relationship with respect to the pattern defining electrodes 75 and 74. The common ground electrodes are each connected to commonly connected voltage terminals 86.

The voltage terminals 79, 86 are connected to the control means 38.

The polarizer 70 causes the light of the laser beam to be polarized in a given plane which is nominally shown by the arrow 88.

The ferroelectric page composer material 72 rotates the plane of the polarized light passing therethrough in accordance with the voltages applied to the respective applied electrodes 74, 75, 76, 77. In order for light passing through a given region of the page composer material 72 to also pass through the analyzer 80 and thus continue on toward the memory material 24, the plane of such passed light must be rotated to coincide with the polarization plane of the analyzer 80, which plane is nominally shown by the arrow 90. In those regions of the page composer material 72 wherein the light is so rotated, the page composer 16 is thereby in effect transparent. If the light passing through a given region is not so rotated to pass through the analyzer 80, that region is in effect opaque to the laser beam as received at the memory material 24.

The control means 38 is capable of selectively programming the page composer for writing information in the memory material 24 by providing appropriate voltages at the terminals 79, 86 to enable a page of information consisting of an opaque and transparent pattern to be provided by the respective regions of the page composer material 72 covered by the predetermined pattern defining electrodes 74, 75. The control means 38 is likewise capable of causing all of such regions to be transparent for enabling reading or erasing of information in the memory material 24.

Referring to FIG. 4, the memory material 24 includes a plano-parallel sandwich of a photoconductor 92 and a ferroelectric material 93. Further descriptions of this memory material 24 are contained in the above cited Keneman et al. patent and Keneman et al. article, said descriptions being incorporated herein by reference thereto. In the preferred embodiment of the present invention the ferroelectric material 93 is a bismuth titanate plate that is cut parallel to the *b* axis and at an angle from the *a-b* plane said angle being in a range of between 4° to 20°, thereby enabling the memory material 24 to be effectively switched between transparent and opaque states when positioned planoparallel to and between the two lens arrays 20 and 28 in the optical memory system of the present invention.

In accordance with the present state of the art of growing single-crystal bismuth titanate (as described in Morrison et al., "The Growth of Large-Crystal $Bi_4Ti_3O_{12}$", Ferroelectrics, 1970, vol. 1, pp. 75–78), when such crystals are cut and formed into a plate as described above they are limited in their lateral planar face dimensions. Therefore when a memory material 24 having larger overall lateral planar face dimensions is desired, the memory material 24 is formed by a mosaic of such crystals.

The memory material 24 additionally includes transparent electrodes 94 and 95 applied to and covering the opposite broad planar faces thereof.

The electrode 94 on the surface of the memory material 24 facing the page composer 16 is connected to a common ground voltage terminal 96; and the other electrode 95 is connected to a voltage terminal 97 to which an appropriate positive or negative voltage may be selectively applied. The voltage terminals 96 and 97 both are connected to the control means 38.

Figure 5:
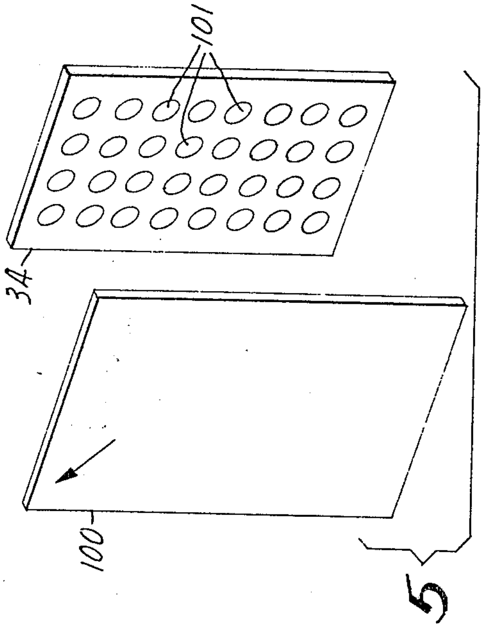
FIG. 5 is a view of the detector included in the system of FIG. 1, showing an array of photodetectors in a predetermined pattern, and an analyzer positioned adjacent the array.

When a region 98 of the photoconductor 92 is sufficiently illuminated by the laser beam the region 99 of the ferroelectric material 93 adjacent thereto is enabled to be switched to or to remain in one of two stable states in accordance with the polarity of the voltage then applied thereto. In a first stable state the region 99 rotates the plane of polarization of the received laser beam in a first direction to enable the laser beam transmitted through the memory material to be detected by a photodetector 101 in the detector array 34 after passing through an analyzer 100 positioned adjacent thereto. (See FIG. 5). When in the first stable state, the region 99 therefore is in effect transparent to the laser beam. In the second stable state the region 99 causes the plane of polarization of light transmitted therethrough to be rotated in the opposite direction and therefore is in effect opaque to the laser beam.

Before writing a page of information in a selected memory location of the memory material 24, any information previously recorded in that memory location is erased.

In order to erase in a selected memory location, appropriate voltages are applied to all of the voltage terminals 79, 86 of the page composer 16 to make the page composer transparent to the laser beam in all defined regions of the page composer material 72; the electron beam of the laser 14 is deflected to cause the laser beam to be addressed to the selected memory location; and an appropriate polarity voltage is applied to the voltage terminals 96, 97 of the memory material 24 to cause the ferroelectric material 93 in each region 99 thereof enabled by illumination of an adjacent photoconductor region 98 to be switched (if not already so switched) to be in the second stable state wherein it 99 is in effect opaque to the laser beam as received at the detector array 34.

In order to write a page of information in a selected memory location, appropriate voltages are applied to selected voltage terminals 79, 86 of the page composer 16 to provide a desired image of binary information defined by a combination of transparent and opaque regions in the page composer material 72 for projection in a parallel laser beam; the laser beam is addressed to the selected memory location; and the opposite polarity voltage is applied to the voltage terminals 96, 97 of the memory material 24 to cause the ferroelectric material 93 in an enabled pattern of region 99 thereof corresponding to the pattern of transparent regions in the page composer material 72, to be switched to the first stable state thereby making the memory material 24 in effect transparent in said enabled pattern of regions 99.

In order to read a page of information in a selected memory location, appropriate voltages are applied to all of the voltage terminals 79, 86 of the page composer 16 to make the page composer transparent in all defined regions of the page composer material 72; the laser beam is addressed to the selected memory location; no voltages are applied to the memory material voltage terminals 96, 97 thereby unaffecting the previously written pattern of transparent and opaque stable states in the selected memory location; and the information in the laser beam passed through the memory material 24 and the analyzer 100 is read (detected) by the detector array 34; whereby those individual photodetectors 101 in a pattern corresponding to the pattern of transparent regions 99 in the selected memory location are activated.

In other embodiments of the optical memory system of the present invention, other types of memory materials which are suitable for exposure and erasure by an electron beam laser may be used. These include a thermoplastic combined with a photoconductor and chalcogenides. In these embodiments the intensity of the laser beam necessarily will be varied for performing read, write and erase operations.

In other embodiments, the page composer material may include KDP, $Bi_{12}SiO_{20}$ or an array of liquid crystals.

Also in another embodiment the page composer may include transparent electrode arrays applied to the page composer material in a pattern such as described in the above cited Roberts article. In using such a page composer the individual bits in a page of binary information are loaded sequentially in the page composer.

What is claimed is:

1. An optical memory system for reading, writing, and erasing information from a memory material having a planar array of memory locations, from each of which memory locations an image of a page of said information is produced at a common location when any said memory location in the array is addressed for reading by a laser beam, which system comprises said memory material;

a two-dimensionally scannable laser for emitting a laser beam for scanning said memory material to address any said memory location with said laser beam;

a first lens positioned for projecting a parallel beam from said emitted laser beam;

a page composer positioned for providing a page of information for projection by the parallel beam for recording in said memory material, which page composer may be selectively programmed to provide the page of information during the writing of information in the memory material, and may be made transparent to said parallel beam during the reading and erasing of said information;

a second lens positioned for projecting toward the memory material an image of the page of information projected in said parallel beam;

a first lens array, consisting of a planar array of identical lenses each having a given f number and focal length, which first lens array is positioned parallel to said memory material whereby the array pattern of the lenses defines a corresponding array pattern of memory locations in the memory material for enabling selected memory locations to be addressed, whereby information may be stored in the memory material by generating in the selected memory location an image of the page of information provided in said parallel beam by the page composer;

a second lens array having an array pattern identical to that of the first lens array, wherein each lens is identical and has a given f number and focal length, which second lens array is positioned parallel to said first lens array and on the opposite side of the memory material therefrom; and a combining lens positioned in combination with the second lens array for enabling generation of an image of the page of information stored in the selected memory location to said common location at which a detector may be positioned for reading information from any addressed selected memory location.

2. A system according to claim 1, wherein the memory material comprises an erasable material including a sandwich of a ferroelectric material and a photoconductor, which memory material is capable of being reversibly switched between transparent and opaque states in areas thereof that are exposed to sufficiently intense illumination when an appropriate polarity voltage is applied to the memory material.

3. A system according to claim 2, wherein the ferroelectric material is a bismuth titanate plate cut parallel to the *b* axis and at an angle from the *a-b* plane, said angle being in a range of between 4° and 20°.

4. A system according to claim 3, further comprising means for controlling the writing, reading and/or erasing of information in the memory material, which control means includes means for applying appropriate polarity voltages to the memory material for switching between transparent and opaque states those areas thereof that are exposed to sufficiently intense illumination.

5. A system according to claim 2, further comprising means for controlling the writing, reading and/or erasing of information in the memory material, which control means includes means for applying appropriate polarity voltages to the memory material for switching between transparent and opaque states those areas thereof that are exposed to sufficiently intense illumination.

6. A system according to claim 1, wherein the page composer comprises a material that can be reversibly switched between transparent and opaque states within given regions thereof by selective voltage application thereto.

7. A system according to claim 6, wherein the page composer further comprises an array of transparent electrodes applied to said page composer material in a predetermined pattern for enabling the provision of a desired image of information corresponding to the pattern in which voltages are applied to the electrodes for projection by said parallel beam during the writing of information in the memory material.

8. A system according to claim 7, wherein the pattern is defined by two separate sets of said electrodes with each pattern defining electrode being individually connected for having a selected voltage applied thereto, with the two sets being applied on opposite sides of the page composer material in a non-opposing relationship, and with common ground electrodes being applied on opposite sides of the page composer material in an opposing relationship with respect to the pattern defining electrodes.

9. A system according to claim 6 wherein the page composer material comprises a transparent ferroelectric ceramic material (PLZT).

10. A system according to claim 9, wherein the page composer further comprises an array of transparent electrodes applied to said page composer material in a predetermined pattern for enabling the provision of a desired image of information corresponding to the pattern in which voltages are applied to the electrodes for projection by said parallel beam during the writing of information in the memory material.

11. A system according to claim 1, wherein the two-dimensionally scannable laser comprises an electron beam laser including an electron gun for producing an electron beam, a planar laser cavity comprising laser material for emitting a laser beam normal to the cavity plane when excited into a stimulated emission state by said electron beam, and means for deflecting said electron beam to provide said laser beam from a selected location on the cavity for addressing any memory location in the memory material.

12. A system according to claim 11, wherein the memory material comprises an erasable material including a sandwich of a ferroelectric material and a photoconductor, which memory material is capable of being reversibly switched between transparent and opaque states in areas thereof that are exposed to sufficiently intense illumination when an appropriate polarity voltage is applied to the memory material; and wherein the system further comprises means for controlling the writing, reading and/or erasing of information in the memory material, which control means includes means for applying appropriate polarity voltages to the memory material for switching between transparent and opaque states those areas thereof that are exposed to sufficiently intense illumination.

13. A system according to claim 12, wherein the ferroelectric material is a bismuth titanate plate and parallel to the *b* axis and at an angle from the *a-b* plane, said angle being in a range of between 4° and 20°.

14. A system according to claim 14, wherein the page composer comprises a material that can be reversibly switched between transparent and opaque states within given regions thereof by selective voltage application thereto; and wherein the page composer further comprises an array of transparent electrodes applied to said page composer material in a predetermined pattern for enabling the provision of a desired image of information corresponding to the pattern in which voltages are applied to the electrodes for projection by said parallel beam during the writing of information in the memory material.

15. A system according to claim 14, wherein the page composer material comprises a transparent ferroelectric ceramic material (PLZT).

16. A system according to claim 1, further comprising a detector positioned at said common location for reading information from any addressed memory location.

17. An optical memory system for reading, writing, and erasing information from a memory material having a planar array of memory locations, from each of which memory locations an image of a page of said information is produced at a common location when any said memory location in the array is addressed for reading by a laser beam, which system comprises a two-dimensionally scannable laser for emitting a laser beam for scanning said memory material to address any said memory location with said laser beam;

a first lens positioned for projecting a parallel beam from said emitted laser beam;

a page composer positioned for providing a page of information for projection by the parallel beam for recording in said memory material, which page composer may be selectively programmed to provide the page of information during the writing of information in the memory material and may be made transparent to said parallel beam during the reading and erasing of said information;

a second lens positioned for projecting toward the memory material an image of the page of information projected in said parallel beam;

a first lens array, consisting of a planar array of identical lenses each having a given f number and focal length, which first lens array is positioned parallel to said memory material whereby the array pattern of the lenses defines a corresponding array pattern of memory locations in the memory material for enabling selected memory locations to be addressed, whereby information may be stored in the memory material by generating in the selected memory location an image of the page of information provided in said parallel beam by the page composer;

a second lens array having an array pattern identical to that of the first lens array, wherein each lens is identical and has a given *f* number and focal length, which second lens array is positioned parallel to said first lens array and on the opposite side of the memory material therefrom; and a combining lens positioned in combination with the second lens array for enabling generation of an image of the page of information stored in the selected memory location to said common location at which a detector may be positioned for reading information from any addressed selected memory location.

18. A system according to claim 17, wherein the two-dimensionally scannable laser comprises an electron beam laser including an electron gun for producing an electron beam, a planar laser cavity comprising laser material for emitting a laser beam normal to the cavity plane when excited into a stimulated emission state by said electron beam, and means for deflecting said electron beam to provide said laser beam from a selected location on the cavity for addressing any memory location in the memory material.

19. A system according to claim 19, further comprising a detector positioned at said common location for reading information from any addressed memory location.

20. A system according to claim 19, further comprising a page composer including a material that can be reversibly switched between transparent and opaque states within given regions thereof by selective voltage application thereto; and an array of transparent electrodes applied to the page composer material in a predetermined pattern for enabling the provision of a desired image of information corresponding to the pattern in which voltages are applied to the electrodes, wherein the predetermined pattern is defined by two separate sets of said electrodes with each pattern defining electrode being individually connected for having a selected voltage applied thereto, with the two sets being applied on opposite sides of the page composer material in a non-opposing relationship, and with common ground electrodes being applied on opposite sides of the page composer material in an opposing relationship with respect to the pattern defining electrodes.

21. An optical memory system for reading, writing, and erasing information from a memory material having a planar array of memory locations, from each of which memory locations an image of a page of said information is produced at a common location when any said memory location in the array is addressed for reading by a laser beam, which system comprises a two-dimensionally scannable laser for emitting a laser beam for scanning said memory material to address any said memory location with said laser beam;

a first lens positioned at its focal length $F_1$ from the laser for projecting a parallel beam from said emitted laser beam;

a page composer positioned at the focal length $F_1$ from the first lens for providing a page of information for projection by the parallel beam for recording in said memory material which page composer may be selectively programmed to provide the page of information during the writing of information in the memory material, and may be made transparent to said parallel beam during the reading and erasing of said information;

a second lens positioned at its focal length $F_2$ from the page composer for projecting toward the memory material an image of the page of information projected in said parallel beam;

a first lens array, consisting of a planar array of identical lenses each having a given $f$ number and a focal length $F_3$ which first lens array is positioned parallel to said memory material at focal length $F_3$ plus the focal length $F_2$ from the second lens and a focal length $F_3$ from the memory plane of the memory material whereby the array pattern of the lense defines a corresponding array pattern of memory location in the memory material for enabling selected memory locations to be addressed, whereby information may be stored in the memory material by generating in the selected memory location an inverted, real image of the page of information provided in said parallel beam by the page composer;

a second lens array having an array pattern identical to that of the first lens array, wherein each lens is identical and has a given f number and a focal length $F_4$, which second lens array is positioned parallel to said first lens array at focal length $F_4$ from the memory plane and on the opposite side of the memory material from the first lens array; and a combining lens having a focal length $F_5$ positioned in combination with the second lens array for enabling generation of an image of the page of information stored in the selected memory location to said common location at which a detector may be positioned for reading information from any addressed selected memory location, said common location being a distance $F_5$ from the combining lens.

22. A system according to claim 21, wherein the two-dimensionally scannable laser comprises an electron beam laser including an electron gun for producing an electron beam, a planar laser cavity comprising laser material for emitting a laser beam normal to the cavity plane when excited into a stimulated emission state by said electron beam, and means for deflecting said electron beam to provide said laser beam from a selected location on the cavity for addressing any memory location in the memory material.

23. A system according to claim 21, further comprising a detector positioned at said common location for reading information from any addressed memory location.

* * * * *